United States Patent [19]

Capen

[11] Patent Number: 4,809,461
[45] Date of Patent: Mar. 7, 1989

[54] FISHING BOBBER

[76] Inventor: John M. Capen, 1321 Sanford Ave., Vermilion, Ohio 44089

[21] Appl. No.: 634,742

[22] Filed: Jul. 26, 1984

[51] Int. Cl.⁴ ............................................. A01K 97/04
[52] U.S. Cl. ..................................... 43/41.2; 43/44.94
[58] Field of Search ....................... 43/41.2, 41, 44.94, 43/44.95

[56] References Cited

U.S. PATENT DOCUMENTS

| | | | |
|---|---|---|---|
| 1,128,205 | 2/1915 | White | 43/41.2 |
| 1,950,933 | 3/1934 | Snell | 43/44.94 |
| 2,629,198 | 2/1953 | Johnston | 43/41.2 |
| 3,208,182 | 9/1965 | Holthaus | 43/41.2 |
| 4,060,925 | 12/1977 | Bias | 43/41.2 |
| 4,075,777 | 2/1978 | Dalton | 43/41.2 |

Primary Examiner—Kurt Rowan
Attorney, Agent, or Firm—Gustalo Nunez

[57] ABSTRACT

A fishing device which can be utilized both in casting and as a bobber. The device is formed of two members, integral to each other, one member forming an airtight compartment and the other member being open. The device is attached to a fish line, filled with water. Live bait is attached to the fish line and placed in the water filled member. The weight of the water permits the device to be used in casting and the water further serves as a cushion thus preventing injury from being inflicted to the live bait when impact with the water is made. Upon contact with the water, the live bait is ejected and the airtight compartment makes the device lighter than the water, thus the device now serves as a bobber and the live bait is constrained within a certain radius of the fishing bobber.

2 Claims, 1 Drawing Sheet

FISHING BOBBER

BACKGROUND OF THE INVENTION

1. Field of the Invention

This invention relates to fishing equipment and more particularly to an improved fish bobber which may be used in casting with live bait such as minnows. In the art of casting a fishing line, it is customary to attach your bait to a line having a weight attached to the line. Also attached to the line would be a float of some kind to keep the line and bait from going to the bottom. It is necessary to use a combination such as the above in order to get the fish line and bait out some distance in the water. However, in a combination such as the above, there is a potential for killing the bait as it hits the water. The bait is not protected from injury in any way.

In the applicant's invention, one only need to use his invention, thus eliminating the necessity of weights and floats. The applicant has invented a devise which is used initially as a weight and subsequently as a bobber. Also, the fishing line is attached to the applicant's invention and the bait is then attached to the fishing line. Further, the applicant's invention is not necessarily limited for use with live bait, but can be used with such things as artificial flies.

2. Description of the Prior Art

A search has not been conducted for the instant invention.

SUMMARY OF THE INVENTION

The fishing bobber contemplated herein is constructed of two members such that when the two members are assembled, one member forms an airtight body. The other member is open on one end and closed at the other end. In an assembled configuration, the fishing bobber can be said to resemble a cigar contained cut at a skewed angle at one end and having the well known cigar shape at the other. The entire construction is tubular for ease in manufacture only. In use, the open member of the fish bobber is filled with water. The live bait is attached to the line, is placed within the water filled member, and the line itself is also attached to the fishing bobber, preferably at the open member side. Due to the weight contributed by the water contained in the open member, the line can be cast at great distances, even in the face of a strong breeze. The live bait is safe inside the water filled member until the fish bobber hits the water at which time, the live bait will leave the open member and be free to swim for the length of the line holding the live bait. In the meantime, the fishing bobber stands up in the water because of the airfilled first member.

The applicant's invention also gives the fisherman more mobility, that is, to those fishermen who use live bait. Live bait, such as minnows, died rather rapidly when removed from their water environment; however, with applicant's invention, such is not the case. The fisherman need only place the minnow in the water filled member and walk to the location of his choice for casting. The minnow is kept alive by the oxygen contained in the water filled member.

DESCRIPTION OF THE PREFERRED EMBODIMENT

Figure 1:
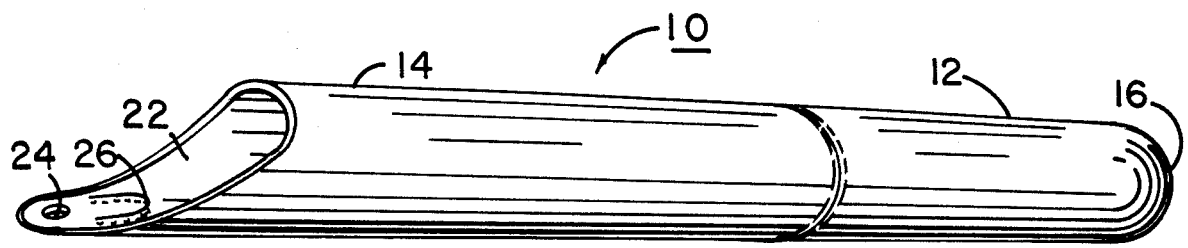
FIG. 1 is an elevation view of the fishing bobber.
Figure 2:
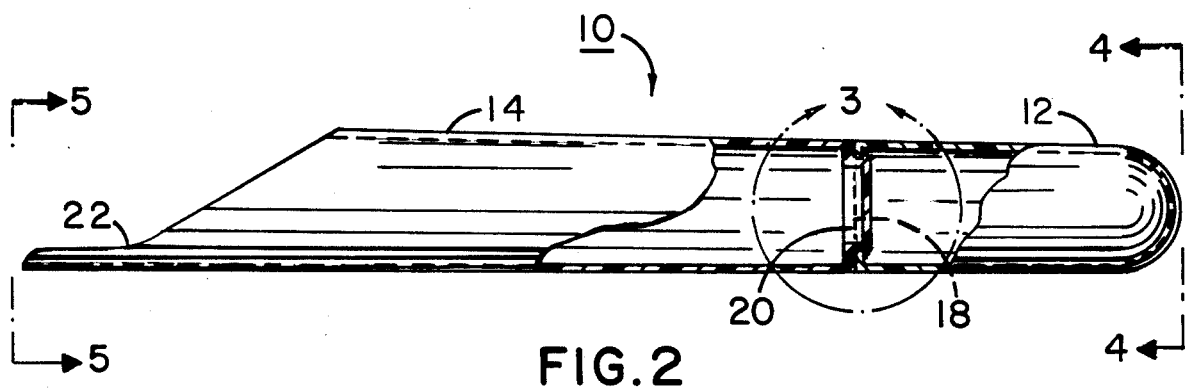
FIG. 2 is a sectional view of the invention such as that shown in FIG. 1.
Figure 3:
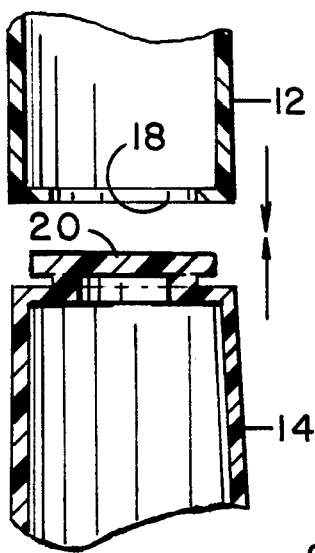
FIG. 3 is an enlarged view of the connecting members comprising the invention, taken at line 3.
Figure 4:
FIG. 4 is an end view of the fishing bobber taken at lines 4—4.
Figure 5:
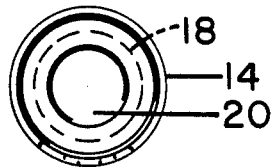
FIG. 5 is an end view of the fishing bobber taken at line 5—5.
Figure 6:
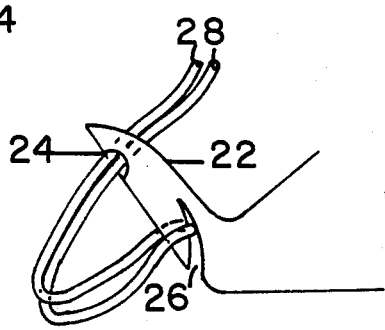
FIG. 6 is a side view of a connecting eye member in combination with an opening.
Figure 7:
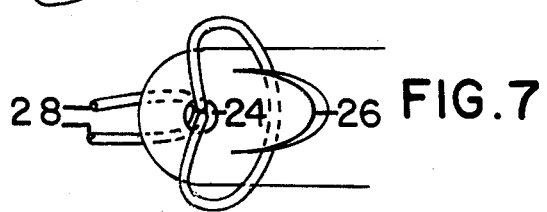
FIG. 7 is a top of the elements shown in FIG. 6.

Referring to FIG. 1, there is illustrated at 10, one embodiment of the fishing bobber comprising the present invention. The fishing bobber 10 consists of a elongated cylinder open at one end and closed at the other in an hemispheric configuration. The fishing bobber 10 is formed of a first member 12 and a second member 14. The materials contemplated for use in manufacturing the fishing bobbers would preferably be plastics because of the ease in manufacturing.

The first member 12 terminates at one end 16 in a closed hemispheric configuration and is open at the other end 18. The second member 14 terminates at end 22 in a skew like construction and located thereon is an aperture 24 and an eyeslit 26, both of which are in alignment with the longitudinal axis of the bobber 10. The other end of second member 14 terminates in a closed raised circular shoulder 20 and is of such a dimension that the shoulder 20 when inserted into the end 18 forms a pressure fit such that the first member 12 and second member 14 become one integral body and also, forming a hermetically sealed air chamber in first member 12.

In use of the fishing bobber described above, a fishing line 28 is attached to the bobber at the end labeled 22. As mentioned earlier, the depth that a fisherman would want the live bait to swim is determined by the length of the line away from the bobber 10. Therefore, once the depth is selected, a loop in the fish line is formed and passed through aperture 24 and over the eye slit 26. Passing the line over the eyeslit 26 prevents the line 28 from sliding thus maintaining the depth that the live bait is permitted to swim is kept constant. Further, the combination of the aperture 24, line 28 and eyeslit 26 keeps the fishing bobber 10 permanently attached to the line 28 until removed for whatever reason.

Once the line 28 is connected to the bobber 10, the open member 14 is filled with water. The bait is connected to the line 28 and is placed inside the water filled member 14. The fisherman is now ready to cast the bobber, the live bait being safe inside the water filled member 14. The bobber is heavy enough to permit casting for large distances while at the same time protecting the live bait from injury. Upon impact with the water, the live bait is ejected from the bobber 10 and the bobber 10 floats in an upright position because of the air filled member 12.

The skew like construction allows and encourages the eviction of the live bait from the second member 14.

While I have illustrated a preferred embodiment of my invention, many modifications may be made without departing from the spirit of the invention, and I do not wish to be limited to the precise details of construction set forth, but wish to avail myself to all changes within the scope of the appended claim.

Having thus described my invention, what I claim as new and desired to secure by Letters Patent of the United States, is:

What I claim is:

1. A flycasting fishing bobber comprising:

a longitudinally elongated tubular body including a first and second members attached to each other, each member having two ends thereof, said first member being an elongated tube closed in the configuration of a projectile nose at one end and open at the said other end, said second member being an elongated tube, open at one end and terminating in a tongue type configuration at said open end, said tongue end including an aperture and an eyeslit, said aperture and eyeslit in alignment with the longitudinal axis of said tubular body, said second end being closed and extending from said closed end, a circular raised shoulder; said shoulder designed for insertion into said open end of said first member thereby forming an air chamber in said first member and an open ended chamber in said second member, said open ended chamber designed to contain water and certain live bait, a line for attaching to said eyeslit through said aperture and to certain live bait, said tubular body when said second member is filled with water and bait, being used in casting, said tubular body further functioning as a bobber when in water, said air chamber in said first member providing the buoyancy required to keep said tubular body afloat.

2. A fisherman's bobber for use in casting in a water medium comprising:

an elongated tubular sleeve having first and second terminating ends and including an air chamber and an open ended chamber, said second end terminating in tongue like construction and said tongue further including an aperture and an eyeslit in alignment with the longitudinal axis of said elongated tubular sleeve, said first end terminating in a closed projectile nose configuration, a line for attaching to said elongated tubular sleeve, said line being connected to said eyeslit through said aperture, said line being further connected to certain live bait, and said open ended chamber when filled with water and containing certain live bait, being used in casting, said live bait being ejected from said water filled chamber when said elongated tubular sleeve contacts said water medium, further, said elongated tubular sleeve remaining in a floating position, said airfilled chamber providing the necessary buoyancy.

* * * * *